United States Patent Office 3,084,144
Patented Apr. 2, 1963

3,084,144
PROCESS FOR POLYMERIZATION OF FLUORINE-CONTAINING ORGANIC COMPOUNDS
George H. Crawford, Jr., Rahway, N.J., assignor, by mesne assignments, to Minnesota Mining and Manufacturing Company, St. Paul, Minn., a corporation of Delaware
No Drawing. Filed July 2, 1956, Ser. No. 595,085
33 Claims. (Cl. 260—87.7)

The present invention relates to an improved process for the polymerization of fluorine-containing organic compounds. In one aspect this invention relates to an improved process for the polymerization of fluorine-containing olefins including both monoolefins and polyolefins to yield polymer products in good yields. In another aspect this invention relates to an improved process for polymerizing trifluorochloroethylene to high molecular weight and essentially pure white thermoplastic homopolymer.

Fluorine-containing polymers including both homopolymers and copolymers have been found to possess many useful applications by virtue of their relative chemical inertness and high physical strength and solvent resistance. Because of these properties, such fluorine-containing polymers can be fabricated into a wide variety of useful articles having improved chemical and physical stability. One of the most useful polymers in this field is the high molecular weight thermoplastic homopolymer of trifluorochloroethylene which possess excellent chemical inertness, flexibility and resilience, and is an efficient insulating material. Polymers derived from fluoro-1,3-dienes such as 2-fluorobutadiene-1,3 also are useful compositions. In certain instances, the industrial application of such fluorine-containing polymers may be limited; however, due to the difficulty in polymerizing fluorine-containing olefins.

There has been a demand in the field of polymerization of fluorine-containing olefins for a generally simplified and improved process for the polymerization of such olefins to solid polymers which process also leads to good conversions of monomer to polymer product which is essentially free of occluded catalyst contaminants. Oftentimes the polymerization system contains ingredients which are only difficultly removed, or cannot be completely removed from the polymer product. Such contaminants may have a detrimental effect on the desirable properties of the polymer, and will cause discoloration, clouding and bubbling of the polymer when the polymer is subjected to elevated temperatures such as, for example, during molding of the polymer.

It is an object of the present invention to provide an improved process for the polymerization of fluorine-containing olefins to polymer products.

Another object is to provide an improved process for the homopolymerization and interpolymerization of fluorine-containing olefins to produce normally solid polymers in good yields and which are essentially free of entrained contaminants derived from the polymerization catalyst system.

Another object is to provide an improved process for polymerizing fluorine-containing monoolefins and especially perfluoro- and perfluorochloro-monoolefins to high polymer products.

A further object is to provide an improved process for polymerizing fluorine-containing polyolefins such as fluoro-1,3-dienes to normally solid polymer products.

A further object is to provide an improved process for the homopolymerization of trifluorochloroethylene to high molecular weight thermoplastic polymer.

A further object is to provide an improved highly efficient process for the production of fluorine-containing elastomers from fluorine-containing vinyl type compounds.

Various other objects and advantages of the present invention will become obvious to those skilled in the art from the accompanying description and disclosure.

Accordingly, the above objects are accomplished by the process which comprises reacting a fluorine-containing organic compound having at least one ethylenic carbon-to-carbon double bond in the presence of a catalyst composition comprising a chlorine-containing organic compound, an organic compound of a metal of group IIIA, and a halide of a transition heavy metal to produce a polymer. The presently described process is carried out at a temperature from about −100° C. to about +200° C., and usually at a temperature between about −20° C. and about 100° C. The process of this invention is particularly advantageous for polymerizing fluorine-containing monoolefins and polyolefins including both partially halogenated and perhalogenated fluorine-containing compounds to normally solid polymer products.

The preferred organic metallo compounds which are used to prepare the catalysts which are used in accordance with this invention are the compounds of aluminum, indium and gallium in which the metal is bonded to at least one alkyl group such as, for example, in the alkyl aluminum halides, alkyl aluminum hydrides and trialkyl aluminum compounds. Of the halides of a transition heavy metal to be used as a starting material in the preparation of the above catalyst composition, the halides, and particularly the chlorides, of metals of groups IVB and VIII are preferred. The chlorine-containing organic compound used as a starting material in the preparation of the presently employed catalyst compositions include aliphatic and aromatic chlorine-containing compounds, preferably having only chlorine or a combination of chlorine and hydrogen bonded to carbon. The presently employed catalyst compositions are prepared by independently adding the organic metallo compound and the metal halide to the chlorine-containing organic compound to produce a liquid composition having a characteristic red color, the red color being attributed to the formation of a complex between the organic metallo compound, the metal halides and the chlorine-containing organic compound. When carbon tetrachloride is employed as the chlorine-containing organic compound starting material, the liquid catalyst composition thereby obtained is stable, that is, no precipitation of solid material is observed after prolonged storage or during its use to effect polymerization of the fluorine-containing olefins hereindescribed. When the other chlorine-containing organic compounds used in accordance with this invention, such as chloroform, for example, are used to prepare the catalyst compositions of this invention some precipitation of solid material occurs upon prolonged standing, which precipitation can be avoided to yield stable liquid catalysts by the addition of n-hexane, for example, to the chloroform before or at the same time that either the organic metallo compound or metal halide are added thereto.

The advantages obtained by using the hereindescribed liquid catalyst compositions to effect polymerization of fluorine-containing vinyl type compounds are numerous, one very important advantage being that polymerization is capable of being effected in a homogeneous medium, i.e., in a medium in which the monomer to be polymerized and the catalyst are present in the same phase. This homogeneity is realized not only at the beginning of the polymerization reaction but also throughout the entire reaction since the catalyst remains in a completely liquid and dissolved state from the beginning to the conclusion of any one polymerization reaction. Due to the homogeneity of the reaction medium, the polymerization process of this invention is easily controlled and represents a generally simplified process which is capable of being conducted in simple equipment and is readily adapted to continuous operation. Since the active catalyst species is in a stable liquid state, the handling of the catalyst is facilitated. A further advantage of the present stable liquid catalyst compositions is that when they are used to effect polymerization of various fluorine-containing vinyl type compounds such as trifluorochloroethylene, for example, the polymer product which forms cannot become occluded within the catalyst and the catalyst in turn, which remains in the liquid state, does not become occluded within the polymer to any appreciable or serious degree. The work-up of the polymer product is thereby facilitated and the efficiency of the process is at a maximum. The polymer product is freed of substantially all color by a simple washing procedure with carbon tetrachloride, for example.

Further, by using the novel catalyst compositions of this invention which enable the polymerization to be carried out in a homogeneous medium, the conversions of monomer employed to polymer product are significantly higher than the conversions obtained under the same reaction conditions of time, pressure, and temperature when the polymerization is effected in the presence of the solid catalyst obtained by contacting the organic metallo compound and metal halide in the absence of the chlorine-containing organic compound such as carbon tetrachloride.

As indicated above, one starting material which is used to produce the novel catalyst compositions of this invention is an organic compound of a group IIIA metal such as aluminum, indium, and gallium, and is a compound in which the metal is bonded to at least one alkyl or aryl group. The organic radical which is common to each of the organic metallo compounds may contain from 1 to about 20 carbon atoms and preferably has not more than 6 carbon atoms per radical. Of the organic metallo compounds to be used as a starting material for the preparation of the present catalyst composition, those that are preferred are compounds of aluminum in which aluminum is bonded to an alkyl radical and is additionally bonded to a member of the group consisting of an alkyl radical, a halogen atom, a hydrogen atom, and any combination thereof and are, for example, the trialkyl aluminum compounds, alkyl aluminum halides and alkyl aluminum hydrides. Of the organic metallo starting materials, which may be used in accordance with this invention, the alkyl aluminum halides such as dialkyl aluminum chlorides and bromides are particularly preferred since these compounds lead to the most active catalyst compositions of this invention. Typical examples of suitable organic metallo compounds to be employed in the preparation of the catalyst composition of this invention are as follows: trimethyl aluminum; triethyl aluminum; tripropyl aluminum; triisobutyl aluminum; aluminum tri-n-hexyl; trimethyl indium; triethyl indium; triphenyl aluminum; triphenyl gallium; diethyl aluminum fluoride; dimethyl aluminum bromide; diethyl aluminum bromide; diisobutyl aluminum chloride; dimethyl aluminum hydride and ethyl aluminum dihydride. It is to be understood that the organic metallo compounds may be employed singly or in admixture without departing from the scope of this invention.

As stated above, a second type of starting material for the production of the present catalyst compositions is a metal halide derivative of a transition heavy metal, viz. a metal of groups IVB, VB, VIB, VIIB and VIII of the periodic system. Thus, various halide derivatives such as chlorides, bromides and oxychlorides of titanium, zirconium, hafnium, thorium, vanadium, columbium, tantalum, chromium, molybdenum, tungsten, manganese, iron, cobalt, nickel, and palladium may be used. Typical examples of suitable compounds of this type which may be employed are as follows: titanium tetrachloride, zirconium tetrachloride, ferric chloride, ferrous chloride, nickel chloride, palladium dichloride, manganese dichloride, chromium dichloride, and tungsten hexachloride. Of these compounds the inorganic chlorides of metals of groups IVB and VIII such as titanium tetrachloride, zirconium tetrachloride and ferric chloride are preferred, the titanium tetrachloride being particularly preferred. These compounds may be used singly or in admixture without departing from the scope of this invention.

The various groups of metals above-referred to, are those set-forth in Deming's Periodic Table used in his book entitled General Chemistry (John Wiley and Sons, Inc., 5th edition) and in the Handbook of Chemistry and Physics, 29th edition (1945), page 314.

As indicated above, a chlorine-containing organic compound also is employed as a starting material to prepare the catalyst compositions of this invention. This starting material may contain from 1 to 15 carbon atoms and preferably contains not more than 8 carbon atom per molecule. The chlorine-containing organic compound may be chlorine-containing aliphatic compound or a chlorine-containing aromatic compound including both partially chlorinated and wholly chlorinated compounds. The chlorine-containing aliphatic compounds to be used include both the saturated and unsaturated compounds and are preferably the straight chain alkanes and alkenes having at least as many chlorine atoms as carbon atoms. Of these aliphatic compounds those having not more than four carbon atoms per molecule are particularly preferred. The preferred alkenes to be used are the nonpolymerizable chlorine-containing alkenes or the alkenes having at least three chlorine atoms bonded to the carbon atoms of an ethylenic double bond. Typical examples of suitable chlorine-containing organic compounds to be used are methylene dichloride, chloroform, carbon tetrachloride, trichloroethylene, tetrachloroethylene, tetrachloroethane, pentachloroethane, 1,2,3-trichloropropane, polychloro- and perchloropropanes, -propenes, -butanes, -butenes, and higher molecular weight homologues, and chlorobenzene.

The novel catalyst compositions of this invention are prepared by independently adding the organic metallo compound and the inorganic metal halide to the chlorine-containing organic compound such as carbon tetrachloride, for example, in the substantial absence of air and moisture. It is preferred to first add the organic metallic to the carbon tetrachloride, for example, followed by the addition thereto of the metal halide component, although the reverse order or independent simultaneous addition may be used without departing from the scope of this invention. The mol ratio of the inorganic metal halide starting material to the organic metallo compound may vary over relatively wide limits and generally ranges between about 0.05:1 and about 2:1 and preferably ranges from about 0.1:1 and about 0.8:1. The number of moles of chlorine-containing organic compound to the total number of moles of organic metallo compound plus the inorganic halide similarly may vary over a relatively wide range such as from about 0.8:1 to about 200:1, the number of moles of the chlorine-containing organic compound such as carbon tetrachloride, preferably being at least equal to the combined number of moles of the other two starting materials. For practical purposes the carbon tetrachloride, for example, generally is not employed in more than a 100 molar excess and usually in not more than a 50 molar excess.

In order to obtain stable liquid catalyst compositions from chlorine-containing organic compounds other than carbon tetrachloride, i.e. stable liquid catalysts from which solid material does not precipitate upon prolonged standing or during use, a hydrocarbon compound such as n-hexane is necessarily employed in addition to the chlorine-containing organic compound. When a hydrocarbon compound is used in conjunction with chlorine-containing compounds other than CCl₄, the mol ratio of this compound to chlorine-containing organic compound such as chloroform, is preferably at least 1:1, although this mol ratio may be as low as 0.5:1 or as high as 100:1 or higher without departing from the scope of this invention. In addition to n-hexane other hydrocarbon type compounds may be used to prepare the stable liquid catalyst composition when chloroform, pentachloroethane or tetrachloroethylene, for example, are employed as a starting material, their use and effect being essentially the same as that of n-hexane in preventing solid material from precipitating from the liquid catalyst composition. Typical examples of such compounds are the aliphatic hydrocarbons or hydroaromatic compounds such as pentane, isopentane, cyclohexane, kerosene, tetrahydronaphthalene, and aromatic hydrocarbons such as benzene, toluene, and xylene. Thus, for example, stable liquid catalyst compositions which possess outstanding reactivity for initiating polymerization of fluorine-containing olefins may be prepared as described herein by the independent addition of diethyl aluminum bromide and titanium tetrachloride, for example, to a mixture of chloroform and pentane or benzene. It is to be understood that these hydrocarbon type compounds may be used in admixture without departing from the scope of this invention. When it is necessary to employ n-hexane, for example, to prepare the stable liquid catalyst compositions of this invention, it is again important that the organic metallo compound and the metal halide be added to the chlorine-containing organic compound independently of each other.

When carbon tetrachloride is used as a starting material, stable liquid catalysts are prepared as described above by the independent addition of the organic metallo compound and the inorganic metal halide, and n-hexane may be added at any stage during the preparation of the liquid catalyst, if desired, since n-hexane is not necessary to obtain the liquid catalyst from which solid material does not precipitate when carbon tetrachloride is employed. Thus when CCl₄ is employed, n-hexane may be added to the stable liquid catalyst after it has been prepared as described above, or the n-hexane may be admixed with the carbon tetrachloride before one or both of the other two components are added, or the n-hexane may be added after or at the same time that either the organic metallo compound or metal halide are added to the carbon tetrachloride.

On the other hand, when one of the above-described chlorine-containing organic compounds other than carbon tetrachloride is used as a starting material it is important that the n-hexane, for example, be present when the organic metallo compound and the metal halide are brought into contact in the chlorine-containing organic compound such as chloroform in order to obtain a liquid catalyst from which no solid material precipitates upon standing or during use. Thus, for example, the organic metallo compound and metal halide may be independently added to an admixture of chloroform and n-hexane; or the metal halide may be added to the n-hexane followed by the addition thereto either simultaneously or in sequence of the chloroform and organic metallo compound.

The independent addition of the organic metallo compound and the metal halide to the carbon tetrachloride, for example, is a very important aspect of the process for making the highly reactive liquid catalyst of this invention, since if one contacts diethyl aluminum bromide and titanium tetrachloride, for example, both of which are liquids at room temperature, in the absence of carbon tetrachloride, for example, a solid material precipitates which solid cannot be dissolved in n-hexane, carbon tetrachloride, chloroform, methylene dichloride, and the like.

The fluorine-containing unsaturated compounds which are polymerized to advantage in accordance with this invention are those having at least one carbon to carbon ethylenic double bond and include the partially halogenated and perhalogenated fluorine-containing mono-unsaturated and poly-unsaturated compounds having from 2 to about 20 carbon atoms and preferably not more than 12 carbon atoms per molecule. Of the fluorine-containing monoolefins to be employed, those that are preferred are compounds having at least as many fluorine atoms as there are carbon atoms and in which any additional halogen substitution is chlorine. The preferred polyolefins to be employed are the fluoro-1,3-butadienes having fluorine as the only halogen substitution and include the alkyl substituted butadienes and the trifluoromethyl substituted butadienes. The olefins to be employed may contain in addition to fluorine other substituents such as, for example, alkoxy, chlorine, bromine and aryl groups.

Typical examples of the monoolefins to be employed are the partially halogenated fluoroethylenes such as vinyl fluoride, vinylidene fluoride, 1,1-difluoro-2-chloroethylene, 1,1-chlorofluoroethylene, and trifluoroethylene; partially halogenated fluoropropenes such as 3,3,3-trifluoropropene, 2-chloro-3,3,3-trifluoropropene, 1,1-difluoropropene, 1,1,3,3,3-pentafluoropropene, and 2,3,3,3-tetrafluoropropene; partially halogenated butenes such as 3,3,3 - trifluoroisobutenes, 1,1,1 - trifluoro - 3 - trifluoromethylbutene-2, and hexafluoroisobutene; perfluorohalomonoolefins such as trifluorochloroethylene, trifluorobromoethylene, tetrafluoroethylene, dichlorodifluoroethylene, hexafluoropropene, 2-chloropentafluoropropene, 4,4-dichloroperfluorocyclobutene, perfluoroisobutene, and perfluorocyclobutene.

Typical examples of fluorine-containing polyolefins to be used are: 2-fluorobutadiene; 2-trifluoromethyl-butadiene; 1,1 - difluorobutadiene; 1,1,2 - trifluorobutadiene; 1,1,3 -trifluorobutadiene; 1,1 - difluoro - 2 - methylbutadiene; 1,1 - difluoro - 3 - methyl - butadiene; 1,1,3-trifluoro - 2 - methyl - butadiene; 1,1,2,4,4 - pentafluorobutadiene; 1,1,2,2-tetrafluorobutadiene; 1,1,2,4,4-pentafluoro-3-methyl-butadiene and hexafluorobutadiene.

Additional examples of monomers which are polymerized in the presence of the above-described catalyst compositions are as follows: phenyltrifluoroethylene; alpha-difluoromethyl styrene; alpha-trifluoromethyl styrene; 1,1,2,2-tetrafluoroethyl vinyl ether; 1,1-dihydrofluoroalkyl vinyl ethers; and trifluoroacrylonitrile.

It is to be understood that the process of this invention is suitable not only for the homopolymerization of any one of the above-mentioned monomers but also for the interpolymerization of these monomers to produce copolymers. The polymerization process also may be used to successfully copolymerize any of the above-mentioned fluorine-containing olefins with other types of vinyl type compounds such as hydrocarbon mono- and poly-olefins. Thus the following monomer mixtures may be polymerized in the presence of the above-described catalyst compositions to yield valuable interpolymers: butadiene and trifluorochloroethylene; butadiene and tetrafluoroethylene; ethylene and tetrafluoroethylene; trifluorochloroethylene and vinylidene fluoride; tetrafluoroethylene and vinylidene fluoride; hexafluoropropene and vinylidene fluoride; hexafluoropropene and tetrafluoroethylene; 1,1,2,2-tetrafluoroethyl vinyl ether and 1,1,2-trifluorobutadiene; 1,1,2 - trifluorobutadiene and 1,1,3 - trifluorobutadiene; phenyltrifluoroethylene and 1,1,3-trifluorobutadiene; 2-trifluoromethyl-butadiene and 2-chloro-3,3,3-trifluoropropene; 2-fluorobutadiene and 2-chloro-3,3,3-trifluoropropene; trifluorochloroethylene, vinylidene fluoride and vinyl chloride.

The number of moles of monomers to be polymerized with respect to the total number of moles of liquid catalyst may vary over relatively wide limits without departing from the scope of this invention. For example, this mole ratio may vary between about 1:1 and about 5000:1, and preferably is between about 100:1 and about 1800:1.

The polymerization process of this invention is carried out at a temperature between about −100° C. and about 200° C. and preferably is effected between about −20° C. and about 100° C. The particularly preferred temperature is between about 0° C. and about 65° C. The pressure to be employed also may vary over relatively wide limits such as from substantially atmospheric pressure to about 1,000 atmospheres, although lower and higher pressures may be used without departing from the scope of this invention. The process is conveniently conducted under autogenous pressure in a suitable pressure vessel. The rate of reaction varies and depends, in general, upon the particular monomer or mixture of monomers used. Generally, the time of reaction varies from about 10 minutes to about 7 days. The longer reaction times, i.e. more than about 1 hour are usually employed when polymerizing a perfluorohalomonoolefin.

The exact nature of the active species of the stable liquid catalysts employed in this invention is not completely understood or known. However, there is evidence which indicates that the active species obtained by the independent addition of the organic metallo compound and the metal halide to the chlorine-containing organic compound such as carbon tetrachloride is a complex of these three starting materials, any excess of the carbon tetrachloride, for example, which may not enter into the formation of the complex serving as a solvent for the active catalyst species. Substantiating evidence for the formation of a complex between the organic metallo compound such as diethyl aluminum bromide, and the metal halide such as titanium tetrachloride, and the chlorine-containing organic compound such as carbon tetrachloride, is the following:

(1) The liquid catalysts possess a characteristic lasting red color indicative of the formation of a complex between the organic metallo compound, the metal halide and the chlorine-containing aliphatic compound. This characteristic color is not observed until both of the metal-containing compounds are added to the chlorine-containing organic compound.

(2) The above-described chlorine-containing organic compounds are specific in their ability to produce a liquid catalyst having the characteristic lasting red coloration and which possesses sufficient reactivity to cause polymerization of the above-described monomers.

(3) When the stable liquid catalysts employed in the process of this invention are diluted with a very large excess of a hydrocarbon compound such as n-hexane no precipitation of solid material occurs. The fact that no precipitation occurs upon dilution with n-hexane is unexpected since when diethyl aluminum bromide and titanium tetrachloride, for example, are admixed a solid material precipitates which solid is insoluble in n-hexane, carbon tetrachloride and other common organic solvents. The fact that no precipitation occurs when the stable liquid catalysts of this invention are diluted with excessive amounts of n-hexane indicates that the diethyl aluminum bromide and the titanium tetrachloride are bound in some manner to the chlorine-containing organic compound and that they are in a different form as compared to the form that they may be in when they are contacted in the absence of the chlorine-containing organic compounds.

It has been found that if one carries out the polymerization of trifluorochloroethylene, for example, in the presence of the solid precipitate which forms when diethyl aluminum bromide and titanium tetrachloride are admixed, and subsequently injects carbon tetrachloride into the reaction medium, a homogenous catalyst and medium are not obtained but instead the catalyst and the reaction medium remain heterogenous. It is further pointed out that the polymer product obtained by polymerization of a fluorine-containing vinyl type compound in the presence of the combination of diethyl aluminum bromide and titanium tetrachloride suspended in hexane, the polymer product possesses a brown to black color due to the occlusion of solid catalyst contaminants which contaminants are only removed with difficulty.

The chlorine-containing organic compounds above-described are unique in their ability to form a stable liquid catalyst from which no solid material precipitates and that of these compounds carbon tetrachloride is further unique in that it leads to the formation of a liquid catalyst which remains as a stable liquid upon prolonged storage or use to effect polymerization reactions without the necessity of using n-hexane to obtain stable liquid catalysts therefrom. Attempts to prepare similar liquid catalyst from various other types of organic compounds either with or without the use of n-hexane were unsuccessful. For example, when diethyl aluminum bromide and titanium tetrachloride are independently added to n-hexane alone; bromobenzene; a mixture of n-hexane and bromobenzene; and Fluorochemical N–43 and Fluorochemical O–75 supplied by Minnesota Mining and Manufacturing Company, a solid precipitate forms which cannot be dissolved in carbon tetrachloride, a mixture of chloroform and hexane or any other common organic solvent.

The following examples are offered as a better understanding of the present invention and are not to be construed as unnecessarily limiting thereto. In the following examples, the organic metallo compounds were prepared by procedures known to those skilled in the art. For example, the diethyl aluminum bromide (boiling point 56° C. at 0.3 mm. mercury pressure) was prepared by reaction of magnalium alloy (2:1 by weight of aluminum:magnesium) with ethyl bromide in the presence of a catalytic amount of a magnesium Grignard reagent at a temperature of about 56° C. In each of the following examples normal precautions were taken to exclude air and moisture, i.e. the chlorine-containing organic compounds and n-hexane were dried over sodium prior to use; the preparation of the catalysts and the polymerization reactions were conducted in a nitrogen atmosphere; and the reaction vessels were dried and flushed with nitrogen prior to introduction of the starting materials.

EXAMPLE 1

This example is intended to illustrate the preparation of the liquid catalyst compositions used in accordance with the present invention.

To a 200 ml. glass flask there were added 100 ml. of anhydrous carbon tetrachloride followed by the independent addition thereto of 2 ml. (0.016 mole) of diethyl aluminum bromide and 0.1 ml. (0.0009 mole) of titanium tetrachloride at room temperature (25° C.), the addition of the titanium tetrachloride being accompanied by stirring. A clear wine-red liquid resulted which was filtered in order to remove any trace amounts of small particles. The filtering was accomplished by transferring the solution to a filtering apparatus in a nitrogen atmosphere. The liquid was then passed through a sintered glass fine grade filter disc into a glass container, and the red colored mother liquor was stored under nitrogen until ready for use. No precipitation of solid material from this liquid catalyst was observed after prolonged standing for many days.

EXAMPLES 2–4

These examples illustrate the polymerization of trifluorochloroethylene in the presence of the liquid catalyst composition of this invention.

A series of experiments was conducted in which various aliquots of the stable liquid catalyst prepared as described in accordance with Example 1 above were added to 300 ml. glass polymerization tubes which had previously been flushed with nitrogen. The contents of each tube were then frozen at liquid nitrogen temperature and 100 grams of trifluorochloroethylene were condensed into each of the tubes. In each case the tube was sealed and the tubes were allowed to stand at 25° C. for a period of 7 days. At the end of this time, solid polymer particles were observed in each tube and the tubes were vented to atmospheric pressure to allow unreacted monomer to escape. In each case carbon tetrachloride (200 ml.) was added to the contents of the tubes with agitation. The reaction mixture was then filtered and the solid polymer was again washed with carbon tetrachloride until essentially all of the red color was removed from the polymer product. In each experiment the solid white polymer was dried for 8 hours at 190° C. The amount of liquid catalyst employed in each experiment as well as the physical properties of the white resinous polytrifluorochloroethylene homopolymer product are indicated in the following Table I. In each run the conversion of monomer employed to polymer product was good, e.g. in Example 2 a 45 percent conversion was obtained.

*Table I*

| Example | Volume of Liquid Catalyst (ml.)[a] | Dilute Solution Viscosity (centistokes)[b] | ZST (Seconds) |
|---|---|---|---|
| 2 | 40 | | |
| 3 | 2 | 1.812 | 818 |
| 4 | 10 | 1.204 | 312 |

[a] Liquid catalyst prepared as described in Example 1, i.e., in which the volume ratio of $CCl_4:(C_2H_5)_2AlBr:TiCl_4$ is 100:2:0.1.
[b] As determined in 0.75% solution of dichlorobenzotrifluoride at 266° F.

EXAMPLES 5–8

Various stable liquid catalysts were prepared by independently adding 2 ml. of diethylaluminum bromide and various amounts of titanium tetrachloride to 25 ml. portions of anhydrous carbon tetrachloride. The amount of titanium tetrachloride added to the 25 ml. of carbon tetrachloride and 2 ml. of diethyl aluminum bromide are indicated in the following Table II. These stable liquid catalysts were prepared following the same general procedure of Example 1 above. Two milliliter aliquots of each of these catalyst preparations were then added to each of four 300 ml. glass polymerization tubes, the tubes having been previously flushed with nitrogen. Into each tube there were then condensed 100 grams of trifluorochloroethylene. In each example, the tube was sealed and allowed to stand at 25° C. for a period of 5 days, after which time the tubes were vented to atmospheric pressure to allow any unreacted monomer to escape. The contents of each tube were then treated with carbon tetrachloride and the polymer product was worked up following the same procedure as described in Examples 2–4 above. In each example essentially pure white high molecular weight polytrifluorochloroethylene was obtained in good yields. The physical properties of the polymer obtained in each case are given in the following Table II.

*Table II*

| Example | Catalyst TiCl$_4$ (ml.) | Preparation[a] CCl$_4$ (ml.) | Amount of Liquid Catalyst Used (ml.) | Dilute Solution Viscosity[b] |
|---|---|---|---|---|
| 5 | 0.02 | 25 | 2 | 1.505 |
| 6 | 0.05 | 25 | 2 | 1.279 |
| 7 | 0.1 | 25 | 2 | 1.486 |
| 8 | 0.25 | 25 | 2 | [c]1.345 |

[a] Each catalyst preparation contained 2.0 ml. of diethly aluminum bromide per 25 ml. of CCl$_4$ and the indicated amount of TiCl$_4$.
[b] As determined in a 0.75% solution of dichlorobenzotrifluoride at 266° F.
[c] ZST=373 seconds.

EXAMPLE 9

A liquid catalyst was prepared by independently adding 1 ml. of diethyl aluminum bromide and 0.25 ml. of titanium tetrachloride to 25 ml. of substantially anhydrous carbon tetrachloride. Of this red liquid 2 ml. were added to a polymerization tube followed by the addition thereto of 300 grams of freshly distilled trifluorochloroethylene. The tube was then sealed and allowed to stand at 25° C. for a period of 7 days. The tube was then opened to allow unreacted monomer to escape, and the contents of the tube were agitated with 200 ml. of carbon tetrachloride. This reaction mixture was then filtered, and the solid polymer product was dried at 190° C. An 80 percent conversion of monomer employed to essentially pure white high molecular weight polytrifluorochloroethylene homopolymer was obtained, said polymer having a ZST of 547 seconds, and a dilute solution viscosity of 1.35 centistokes as determined in a 0.75 percent solution of dichlorobenzotrifluoride at 266° F.

EXAMPLE 10

After flushing a 300 ml. glass polymerization tube with nitrogen, the tube was evacuated and was charged with 0.68 gram of diethyl aluminum bromide. The contents of the tube were frozen at liquid nitrogen temperature followed by the addition thereto of 0.28 gram of titanium tetrachloride. After refreezing the contents of the tube, 100 grams of trifluorochloroethylene were condensed into the tube in the absence of air and moisture. The tube was then sealed and was allowed to stand at 25° C. for 5 days yielding a 10 percent conversion of total monomer employed to polytrifluorochloroethylene homopolymer having a ZST of 95 seconds and a dilute solution viscosity of 0.40 centistoke as determined in a 0.75 percent solution of dichlorobenzotrifluoride at 266° F.

By comparing the results obtained by the procedure of Example 10 with Examples 2–9 above, it is apparent that the liquid catalyst compositions of this invention lead to improved conversions of trifluorochloroethylene to polymer product, and that a higher molecular weight product is obtained as compared to that of the product obtained when the catalyst consists essentially of titanium tetrachloride and diethyl aluminum bromide.

EXAMPLE 11

To 0.5 ml. of carbon tetrachloride there were independently added at room temperature 0.02 ml. of diethyl aluminum bromide and 0.002 ml. of titanium tetrachloride. The resultant red liquid was charged to a 10 ml. polymerization tube. The tube was then cooled in a liquid nitrogen bath followed by the addition thereto of 10 grams of 1,1,3-trifluorobutadiene. The tube was then sealed and the polymerization reaction was allowed to proceed for a period of 30 minutes at 25° C. under autogenous pressure. The tube was then transferred to a liquid nitrogen bath and was vented to atmospheric pressure. The solid polymer product was collected by filtration and was washed with n-hexane and dried in a vacuum oven at 80° C. A white tough rubbery homopolymer of 1,1,3-trifluorobutadiene was obtained in a quantitative conversion of monomer employed.

EXAMPLE 12

To 0.5 ml. of carbon tetrachloride there were independently added at room temperature 0.2 ml. of diethyl aluminum bromide and 0.002 ml. of titanium tetrachloride. The resultant red liquid was charged to a 10 ml. polymerization tube. The tube was then cooled in a liquid nitrogen bath followed by the addition thereto of 10 grams of 2-fluorobutadiene. The tube was then sealed and the polymerization reaction was allowed to proceed for a period of 5 minutes at 25° C. under autogenous pressure. The tube was then transferred to a liquid nitrogen bath and was vented to atmospheric pressure. The solid polymer product was collected by filtration and was washed with n-hexane and dried in a vacuum oven at 80° C. A white rubbery homopolymer of 2-fluorobutadiene was obtained in good yield.

EXAMPLE 13

To 0.5 ml. of carbon tetrachloride there were independently added at room temperature 0.02 ml. of diethyl aluminum bromide and 0.002 ml. of titanium tetrachloride. The resultant red liquid was charged to a 10 ml. polymerization tube. The tube was then cooled in a liquid nitrogen bath followed by the addition thereto of 10 grams of 1,1-difluorobutadiene. The tube was then sealed and the polymerization reaction was allowed to proceed for a period of 5 days at 25° C. under autogenous pressure while rotating the tube end-over-end. The tube was then transferred to a liquid nitrogen bath and was vented to atmospheric pressure. The solid polymer product was collected by filtration and was washed with n-hexane and dried in a vacuum oven at 80° C. A white tough rubbery homopolymer of 1,1-difluorobutadiene was obtained in good yield.

EXAMPLE 14

To 0.5 ml. of carbon tetrachloride there were independently added at room temperature 0.02 ml. of diethyl aluminum bromide and 0.002 ml. of titanium tetrachloride. The resultant red liquid was charged to a 10 ml. polymerization tube. The tube was then cooled in a liquid nitrogen bath followed by the addition thereto of a monomer mixture containing 5 grams each of 1,1,3-trifluorobutadiene and 1,1,2-trifluorobutadiene. The tube was then sealed and the copolymerization reaction was carried out for about 10 minutes at 25° C. under autogenous pressure while the tube was rotated end-over-end. The tube was then transferred to a liquid nitrogen bath and vented to atmospheric pressure. The solid copolymer product was collected by filtration and was washed with n-hexane and dried in vacuo at about 80° C. A snappy white rubbery copolymer of 1,1,3-trifluorobutadiene and 1,1,2-trifluorobutadiene was obtained in an 86 percent conversion of total monomer charged to polymer product.

EXAMPLE 15

To 0.5 ml. of carbon tetrachloride there were independently added at room temperature 0.02 ml. of diethyl aluminum bromide and 0.002 ml. of titanium tetrachloride. The resultant red liquid was charged to a 10 ml. polymerization tube. The tube was then cooled in a liquid nitrogen bath followed by the addition thereto of a monomer mixture containing 5 grams each of 2-trifluoromethyl-butadiene and 1,1,2-trifluorobutadiene. The tube was then sealed and the copolymerization reaction was carried out for about 10 minutes at 25° C. under autogenous pressure while the tube was rotated end-over-end. The tube was then transferred to a liquid nitrogen bath and vented to atmospheric pressure. The solid copolymer product was collected by filtration and was washed with n-hexane and dried in vacuo at about 80° C. A copolymer of 2-trifluoromethyl-butadiene and 1,1,2-trifluorobutadiene was obtained in a 96 percent conversion of total monomer charged to polymer product.

EXAMPLE 16

To 0.5 ml. of carbon tetrachloride there were independently added at room temperature 0.02 ml. of diethyl aluminum bromide and 0.002 ml. of titanium tetrachloride. The resultant red liquid was charged to a 10 ml. polymerization tube. The tube was then cooled in a liquid nitrogen bath followed by the addition thereto of a monomer mixture containing 5 grams each of 1,1,3-trifluorobutadiene and 2-trifluoromethyl-butadiene. The tube was then sealed and the copolymerization reaction was carried out for about 10 minutes at 25° C. under autogenous pressure while the tube was rotated end-over-end. The tube was then transferred to a liquid nitrogen bath and vented to atmospheric pressure. The solid copolymer product was collected by filtration and was washed with n-hexane and dried in vacuo at about 80° C. A white rubbery copolymer of 1,1,3-trifluorobutadiene and 2-trifluoromethyl-butadiene was obtained in a good conversion of total monomers charged to polymer product.

EXAMPLE 17

To 0.5 ml. of carbon tetrachloride there were independently added at room temperature 0.02 ml. of diethyl aluminum bromide and 0.002 ml. of titanium tetrachloride. The resultant red liquid was charged to a 10 ml. polymerization tube. The tube was then cooled in a liquid nitrogen bath followed by the addition thereto of 10 grams of 1,1,2-trifluorobutadiene. The tube was then sealed and the polymerization reaction was allowed to proceed for a period of 5 minutes at 25° C. under autogenous pressure. The tube was then transferred to a liquid nitrogen bath and was vented to atmospheric pressure. The solid polymer product was collected by filtration and was washed with n-hexane and dried in a vacuum oven at 80° C. A white rubbery powdery homopolymer of 1,1,2-trifluorobutadiene was obtained in a 90 percent conversion of monomer employed.

EXAMPLE 18

To 0.5 ml. of carbon tetrachloride there were independently added at room temperature 0.02 ml. of diethyl aluminum bromide and 0.002 ml. of titanium tetrachloride. The resultant red liquid was charged to a 10 ml. polymerization tube. The tube was then cooled in a liquid nitrogen bath followed by the addition thereto of 10 grams of 1,1-difluorobutadiene. The tube was then sealed and the polymerization reaction was allowed to proceed for a period of 2 minutes at 25° C. under autogenous pressure. The tube was then transferred to a liquid nitrogen bath and was vented to atmospheric pressure. The solid polymer product was collected by filtration and was washed with n-hexane and dried in a vacuum oven at 80° C. A white rubbery powder of poly-1,1-difluorobutadiene was obtained in a 95 percent conversion of monomer charged.

EXAMPLE 19

After flushing a 300 ml. glass polymerization tube with nitrogen, the vessel is charged with 10 ml. of carbon tetrachloride followed by the independent addition thereto of 1 ml. (0.00825 mole) of diethyl aluminum bromide and 0.5 ml. (0.0045 mole) of titanium tetrachloride. The contents of the tube are then frozen at liquid nitrogen temperature and about 50 grams of vinylidene fluoride are condensed into the tube, after which the tube is sealed. The reaction mixture is allowed to stand at about 30° C. for a period of about 3 days to produce solid polyvinylidene fluoride in good yield.

EXAMPLE 20

To 200 ml. of carbon tetrachloride there are independently added at room temperature 4 ml. of triisobutyl aluminum and 1 ml. of titanium tetrachloride. A clear red liquid is obtained from which no solid precipitates. A 20 ml. aliquot of this liquid preparation is then transferred to a 300 ml. glass polymerization tube. After freezing the contents of the tube at liquid nitrogen temperature, about 100 grams of trifluorochloroethylene are condensed into the tube. The polymerization reaction is allowed to proceed at about 35° C. for a period of 24 hours under autogenous pressure to yield white high molecular weight polytrifluorochloroethylene in good yield.

EXAMPLE 21

After flushing a glass polymerization tube having a volume capacity of 300 ml. with nitrogen there are added 25 ml. of anhydrous n-hexane and 25 ml. of anhydrous chloroform followed by the independent addition thereto of 1 ml. of diethyl aluminum bromide and 0.2 ml. of titanium tetrachloride. A clear wine-red liquid is obtained from which no solid material precipitates upon prolonged standing at room temperature. About 25 grams of trifluorochloroethylene are condensed into the tube at liquid nitrogen temperature and the tube is sealed.

The polymerization reaction is allowed to proceed at about 25° C. for a period of about 20 hours under autogenous pressure to yield white high molecular weight polytrifluorochloroethylene thermoplastic in good yield.

EXAMPLE 22

To a glass polymerization vessel there are added 100 ml. of pentachloroethane and 100 ml. of n-hexane followed by the independent addition thereto of 0.5 ml. of diisobutyl aluminum hydride and 0.1 ml. of titanium tetrachloride at room temperature. A clear dark red liquid is obtained from which no solid precipitates. Trifluorochloroethylene is then fed into this liquid catalyst composition at liquid nitrogen temperature, and the polymerization reaction is allowed to proceed at 25° C. under autogenous pressure to yield white high molecular polytrifluorochloroethylene in good yield.

EXAMPLE 23

After flushing a glass polymerization tube having a volume capacity of 300 ml. with nitrogen, the tube is charged with a 10 milliliter aliquot of the liquid catalyst composition prepared in accordance with Example 1 above. The contents of the polymerization vessel are then frozen at liquid nitrogen temperature followed by the addition thereto of a gaseous mixture (100 grams) containing 45 mol percent of trifluorochloroethylene and 55 mol percent of vinylidene fluoride. The polymerization reaction is conducted under autogenous pressure at about 25° C. for a period of 24 hours after which time the solid polymer product is collected by filtration, washed with carbon tetrachloride and dried in vacuum. A white rubbery copolymer of trifluorochloroethylene and vinylidene fluoride is obtained in good yield as the product of the process.

EXAMPLE 24

To 200 ml. of carbon tetrachloride there are added independently of each other 4 ml. of triisobutyl aluminum and 1 ml. of titanium tetrachloride. This red colored stable solution is then added to an 8 foot glass column containing two liters of technical grade and freshly dried n-hexane. No precipitation of solid material is observed. A gaseous mixture containing 50 mol percent of each of 1,1,3-trifluorobutadiene and 1,1,2-trifluorobutadiene is then passed into this liquid catalyst through a sintered glass disc positioned in the bottom of the column at a rate of about 12 mols per hour. The mixture of monomers is absorbed quantitatively at about 25° C. and at atmospheric pressure. After this period the feed of monomers is discontinued and the catalyst containing solution is drained from the bottom of the column while continuously adding fresh carbon tetrachloride through the top of the column. This process is continued until the solid polymer product remaining in the tower is essentially pure white. The polymer product is then removed from the bottom of the reactor, washed with methanol and dried overnight at 100° C. About 100 grams of a white rubbery copolymer of 1,1,3-trifluorobutadiene and 1,1,2-trifluorobutadiene is obtained as the product of the process.

It is to be understood that the other fluorine-containing monomers mentioned hereinabove such as tetrafluoroethylene, trifluorobromoethylene, a monomer mixture of hexafluoropropene and vinylidene fluoride, etc., similarly may be advantageously polymerized in accordance with the procedures of the above examples to produce polymer products. In addition the above-defined fluorine-containing olefins are advantageously polymerized in the presence of the other catalyst compositions of this invention such as the homogeneous catalyst solutions prepared by the independent addition of diethyl aluminum bromide and ferric chloride to carbon tetrachloride; or by the independent addition of diethyl aluminum chloride and titanium tetrachloride to a mixture of chloroform and n-hexane; or by the independent addition of diethyl aluminum bromide and titanium tetrachloride to an admixture of 1,2,3-trichloropropane and hexane, etc.

The polymerization process of this invention may be carried out in a batchwise manner or in a continuous manner without departing from the scope of this invention. In one embodiment of operating in a continuous manner, an admixture of 1,1,3-trifluorobutadiene and 1,1,2-trifluorobutadiene, for example, is continuously passed into the homogeneous catalyst solution comprising diethyl aluminum bromide, titanium tetrachloride and carbon tetrachloride, for example, while withdrawing the suspension of solid copolymer as it is formed, maintaining the liquid volume in the polymerization zone at the desired level by adding hexane or additional carbon tetrachloride thereto. The solid polymer product may be recovered by decantation or filtration techniques, and the recovered carbon tetrachloride solution returned to the polymerization zone with or without the independent addition thereto of additional diethyl aluminum bromide and titanium tetrachloride, the necessity for adding more bromide and metal chloride being determined by observing the rate at which the monomers are being converted to solid copolymer. The efficiency of the presently described process is at a maximum since the chlorine-containing organic compounds and hydrocarbon type compound, when used, can be recovered and recycled to the polymerization zone, and since essentially no catalyst is lost by occlusion within the polymer product.

The various polymers produced from 1,1-difluorobutadienes such as 1,1-difluorobutadiene and 1,1,3-trifluorobutadiene, in accordance with the process of this invention, possess highly desirable chemical and physical properties which makes them useful for the fabrication of a wide variety of articles or for application to various surfaces as protective coatings. In such uses, the raw polymers can be pressed into sheets at temperatures between about 210° F. and about 400° F. from which various articles such as gaskets, diaphragms, etc., can be fabricated. When employed as protective coatings, such polymers may be dissolved in various organic solvents such as diisobutyl ketone, and the solutions thereby obtained applied to metal surfaces, for example, by spray or brush techniques.

As is apparent the present invention relates to an improved process for polymerizing fluorine-containing olefins to polymer products. The catalyst compositions which are used to effect such a polymerization reaction are conveniently prepared as described hereinabove, at room temperature although they also may be prepared at lower and higher temperatures such as from about −100° C. to the boiling point of the chlorine-containing organic compound alone or in admixture with the above-mentioned hydrocarbon compounds. The homogeneous catalyst solutions used in the process of this invention may be frozen at liquid nitrogen temperature for storage or other purposes, and then heated to the desired polymerization temperature without loss of catalyst activity or stability.

Although the organic metallo compound, the metal halide and the chlorine-containing organic compound are referred to herein as starting materials for the preparation of the catalysts, it is to be understood that this does not necessarily mean that they are converted to different chemical compounds. It is believed that they unite in some manner to form a complex which is soluble in the chlorine-containing organic compound such as carbon tetrachloride. Irrespective of their mode of operation, however, the fact remains that when the organic metallo compound and the metal halide are independently admixed in the presence of the chlorine-containing organic compounds as described herein, a homogeneous catalyst solution is obtained which possesses the above advantages for polymerizing fluorine-containing vinyl type compounds to polymer products. The theory and reasons advanced in explaining the invention should not be con- Having described my invention, I claim:

1. A process which comprises polymerizing a fluorine-containing ethylenically unsaturated compound having at least one carbon to carbon ethylenic double bond and containing from 2 to about 12 carbon atoms per molecule in admixture with a catalyst composition comprising a liquid organic solution of a chlorine-containing aliphatic compound possessing 1 to 15 carbon atoms and having at least as many chlorine atoms as carbon atoms, to which solution has been independently added an alkyl aluminum compound, and a halide of a metal of group IVB, thereby producing a polymer.

2. A process which comprises polymerizing a fluorine-containing ethylenically unsaturated compound having at least one carbon to carbon ethylenic double bond and containing from 2 to about 12 carbon atoms per molecule in admixture with a catalyst composition comprising a liquid organic solution of a chlorine-containing aliphatic compound possessing 1 to 15 carbon atoms and having at least as many chlorine atoms as carbon atoms, to which solution has been independently added an alkyl aluminum halide, and a halide of a metal of group IVB, thereby producing a polymer.

3. The process of claim 2 in which said alkyl aluminum compound is diethyl aluminum bromide.

4. The process of claim 2 in which said alkyl aluminum compound is diethyl aluminum chloride.

5. A process which comprises polymerizing a fluorine-containing ethylenically unsaturated compound having at least one carbon to carbon ethylenic double bond and containing from 2 to about 12 carbon atoms per molecule in admixture with a catalyst composition comprising a liquid organic solution of a chlorine-containing aliphatic compound possessing 1 to 15 carbon atoms and having at least as many chlorine atoms as carbon atoms, to which solution has been independently added a trialkyl aluminum compound, and a halide of a metal of group IVB, thereby producing a polymer.

6. The process of claim 5 in which said trialkyl aluminum compound is triisobutyl aluminum.

7. A process which comprises polymerizing a fluorine-containing ethylenically unsaturated compound having at least one carbon to carbon ethylenic double bond and containing from 2 to about 12 carbon atoms per molecule in admixture with a catalyst composition comprising a liquid organic solution of a chlorine-containing aliphatic compound possessing 1 to 15 carbon atoms and having at least as many chlorine atoms as carbon atoms, to which solution has been independently added an alkyl aluminum hydride, and a halide of a metal of group IVB, thereby producing a polymer.

8. The process of claim 7 in which said alkyl aluminum hydride is diisobutyl aluminum hydride.

9. A process which comprises polymerizing a fluorine-containing ethylenically unsaturated compound having at least one carbon to carbon ethylenic double bond and containing from 2 to about 12 carbon atoms per molecule in admixture with a liquid catalyst composition comprising carbon tetrachloride, an alkyl aluminum compound, and a halide of a transition heavy metal.

10. A process which comprises polymerizing a fluorine-containing ethylenically unsaturated compound having at least one carbon to carbon ethylenic double bond and containing from 2 to about 12 carbon atoms per molecule in admixture with a liquid catalyst composition comprising chloroform, an alkyl aluminum compound, and a halide of a transition heavy metal.

11. A process which comprises polymerizing a fluorine-containing ethylenically unsaturated compound having at least one carbon to carbon ethylenic double bond and containing from 2 to about 12 carbon atoms per molecule in admixture with a liquid catalyst composition comprising pentachloroethane, an alkyl aluminum compound, and a halide of a transition heavy metal.

12. A process which comprises polymerizing a fluorine-containing ethylenically unsaturated compound having at least one carbon to carbon ethylenic double bond and containing from 2 to about 12 carbon atoms per molecule in admixture with a liquid catalyst composition comprising tetrachloroethylene, an alkyl aluminum compound, and a halide of a transition heavy metal.

13. A process which comprises polymerizing a fluorine-containing ethylenically unsaturated compound having at least one carbon to carbon ethylenic double bond and containing from 2 to about 12 carbon atoms per molecule in admixture with a catalyst composition comprising a liquid organic solution of a chlorine-containing aliphatic compound possessing 1 to 15 carbon atoms and having at least as many chlorine atoms as carbon atoms, to which solution has been independently added an alkyl aluminum compound, and titanium tetrachloride, thereby producing a polymer.

14. A process which comprises polymerizing a fluorine-containing ethylenically unsaturated compound having at least one carbon to carbon ethylenic double bond and containing from 2 to about 12 carbon atoms per molecule in admixture with a catalyst composition comprising a liquid organic solution of a chlorine-containing aliphatic compound possessing 1 to 15 carbon atoms and having at least as many chlorine atoms as carbon atoms, to which solution has been independently added an alkyl aluminum compound, and a halide of a metal of group VIII, thereby producing a polymer.

15. The process of claim 14 in which said halide of a metal of group VIII is ferric chloride.

16. A process which comprises polymerizing a fluoromonoolefin in admixture with a catalyst composition comprising a liquid chlorine-containing organic solvent, to which liquid has been added independently an alkyl aluminum compound, and a chloride of a transition heavy metal, to produce a polymer of the fluoromonoolefin.

17. A process which comprises polymerizing a perhalogenated fluorine-containing monoolefin in admixture with a catalyst composition comprising a liquid organic solution of a chlorine-containing aliphatic compound possessing 1 to 15 carbon atoms and having at least as many chlorine atoms as carbon atoms, to which solution has been independently added an alkyl aluminum compound and a chloride of a metal of group IVB, thereby producing a polymer of said fluorine-containing monoolefin.

18. A process which comprises polymerizing trifluorochloroethylene at a temperature between about −100° C. and about +200° C. in admixture with a liquid catalyst composition comprising a chlorine-containing aliphatic compound possessing 1 to 15 carbon atoms and having at least as many chlorine atoms as carbon atoms, an alkyl aluminum compound, and a chloride of a metal of group IVB, to produce a polymer of trifluorochloroethylene.

19. A process which comprises homopolymerizing trifluorochloroethylene at a temperature between about −20° C. and about 100° C. in admixture with a liquid catalyst composition comprising diethyl aluminum bromide, titanium tetrachloride and carbon tetrachloride, to produce a solid homopolymer of trifluorochloroethylene.

20. A process which comprises homopolymerizing trifluorochloroethylene at a temperature between about −20° C. and about 100° C. in admixture with a liquid catalyst composition comprising triisobutyl aluminum, titanium tetrachloride and carbon tetrachloride, to produce a solid homopolymer of trifluorochloroethylene.

21. A process which comprises homopolymerizing trifluorochloroethylene at a temperature between about −20° C. and about 100° C. in admixture with a liquid catalyst composition comprising diethyl aluminum bromide, titanium tetrachloride, chloroform and n-hexane, to produce a solid homopolymer of trifluorochloroethylene.

22. A process which comprises homopolymerizing trifluorochloroethylene at a temperature between about −20° C. and about 100° C. in admixture with a liquid catalyst composition comprising diisobutyl aluminum hydride, titanium tetrachloride, pentachloroethane and n-hexane, to produce a solid homopolymer of trifluorochloroethylene.

23. A process which comprises copolymerizing trifluorochloroethylene and vinylidene fluoride at a temperature between about −20° C. and about 100° C. in admixture with a liquid catalyst composition comprising carbon tetrachloride, diethyl aluminum bromide and titanium tetrachloride, to produce a copolymer of trifluorochloroethylene and vinylidene fluoride.

24. A process which comprises polymerizing a partially halogenated fluorine-containing monoolefin in admixture with a catalyst composition comprising a liquid organic solution of a chlorine-containing aliphatic compound possessing from 1 to 15 carbon atoms and having at least as many chlorine atoms as carbon atoms, to which solution has been independently added an alkyl aluminum compound and a chloride of a metal of group IVB, to produce a polymer of said fluorine-containing monoolefin.

25. A process which comprises homopolymerizing vinylidene fluoride at a temperature between about −20° C. and about 100° C. in admixture with a liquid catalyst composition comprising diethyl aluminum bromide, titanium tetrachloride and carbon tetrachloride, to produce a solid homopolymer of vinylidene fluoride.

26. A process which comprises polymerizing a fluoro-1,3-diene in admixture with a catalyst composition comprising a chlorine-containing organic compound, an alkyl aluminum compound, and a chloride of a transition heavy metal, to produce a polymer of the fluoro-1,3-diene.

27. A process which comprises homopolymerizing 1,1,2-trifluorobutadiene at a temperature between about −20° C. and about 100° C. in admixture with a liquid catalyst composition comprising diethyl aluminum bromide, titanium tetrachloride and carbon tetrachloride, to produce a solid homopolymer of 1,1,2-trifluorobutadiene.

28. A process which comprises homopolymerizing 1,1,3-trifluorobutadiene at a temperature between about −20° C. and about 100° C. in admixture with a liquid catalyst composition comprising diethyl aluminum bromide, titanium tetrachloride and carbon tetrachloride, to produce a solid homopolymer of 1,1,3-trifluorobutadiene.

29. A process which comprises copolymerizing 1,1,2-trifluorobutadiene and 1,1,3-trifluorobutadiene at a temperature between about −20° C. and about 100° C. in admixture with a liquid catalyst composition comprising carbon tetrachloride; diethyl aluminum bromide and titanium tetrachloride, to produce a copolymer of 1,1,2-trifluorobutadiene and 1,1,3-trifluorobutadiene.

30. A process which comprises copolymerizing 1,1,2-trifluorobutadiene and 1,1,3-trifluorobutadiene at a temperature between about −20° C. and about 100° C. in admixture with a liquid catalyst composition comprising carbon tetrachloride; triisobutyl aluminum and titanium tetrachloride, to produce a copolymer of 1,1,2-trifluorobutadiene and 1,1,3-trifluorobutadiene.

31. A process which comprises copolymerizing 1,1,2-trifluorobutadiene and 2-trifluoromethyl-butadiene at a temperature between about −20° C. and about 100° C. in admixture with a liquid catalyst composition comprising carbon tetrachloride, diethyl aluminum bromide and titanium tetrachloride, to produce a copolymer of 1,1,2-trifluorobutadiene and 2-trifluoromethyl-butadiene.

32. A process which comprises polymerizing 2-fluorobutadiene at a temperature between about −20° C. and about 100° C. in admixture with a liquid catalyst composition comprising carbon tetrachloride, diethyl aluminum bromide, and titanium tetrachloride, to produce a polymer of 2-fluorobutadiene.

33. A process which comprises polymerizing 1,1-difluoro-butadiene at a temperature between about −20° C. and about 100° C. in admixture with a liquid catalyst composition comprising carbon tetrachloride, diethyl aluminum bromide, and titanium tetrachloride, to produce a polymer of 1,1-difluorobutadiene.

References Cited in the file of this patent
UNITED STATES PATENTS

| 2,484,530 | Schroeder | Oct. 11, 1949 |
|---|---|---|
| 2,683,140 | Howard | July 6, 1954 |
| 2,689,241 | Dittman et al. | Sept. 14, 1954 |
| 2,694,054 | Thomas | Nov. 9, 1954 |
| 2,710,854 | Seelig | June 14, 1955 |
| 2,781,410 | Ziegler | Feb. 12, 1957 |
| 2,824,089 | Peters et al. | Feb. 18, 1958 |
| 2,827,447 | Nowlin et al. | Mar. 18, 1958 |
| 2,832,759 | Nowlin et al. | Apr. 29, 1958 |
| 2,840,551 | Field et al. | June 24, 1958 |
| 2,842,474 | Pratt | July 8, 1958 |
| 2,881,156 | Pilar et al. | Apr. 7, 1959 |
| 2,932,633 | Juveland et al. | Apr. 12, 1960 |

FOREIGN PATENTS

| 533,362 | Belgium | May 16, 1955 |
|---|---|---|
| 534,792 | Belgium | Jan. 31, 1955 |

OTHER REFERENCES

Moeller, "Inorganic Chemistry" (1952), page 405.